No. 875,912. PATENTED JAN. 7, 1908.
B. HEYMANN.
TURBINE.
APPLICATION FILED AUG. 24, 1906.

Witnesses: Inventor

UNITED STATES PATENT OFFICE.

BRUNO HEYMANN, OF MILLERS, NEVADA.

TURBINE.

No. 875,912.   Specification of Letters Patent.   Patented Jan. 7, 1908.

Application filed August 24, 1906. Serial No. 331,840.

*To all whom it may concern:*

Be it known that I, BRUNO HEYMANN, residing at Millers, in the county of Esmeralda and State of Nevada, have invented certain new and useful Improvements in Turbine Construction, of which the following is a full, clear, and exact description, such as will enable others skilled in the art to which it appertains to make and use the same.
This invention relates to fluid pressure engines, and more specifically to those of the turbine type.

One of the objects thereof is to provide an efficient engine of the above character in which all undesirable thrust is balanced.

Another object is to provide a simple and compact turbine construction in which the stuffing boxes or equivalent elements are shielded from exposure to a high pressure fluid.

Another object is to provide a steam turbine in which the motive fluid is economically used and the vanes subjected merely to the action of dry steam.
Another object is to provide a turbine characterized by a wide range of control.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
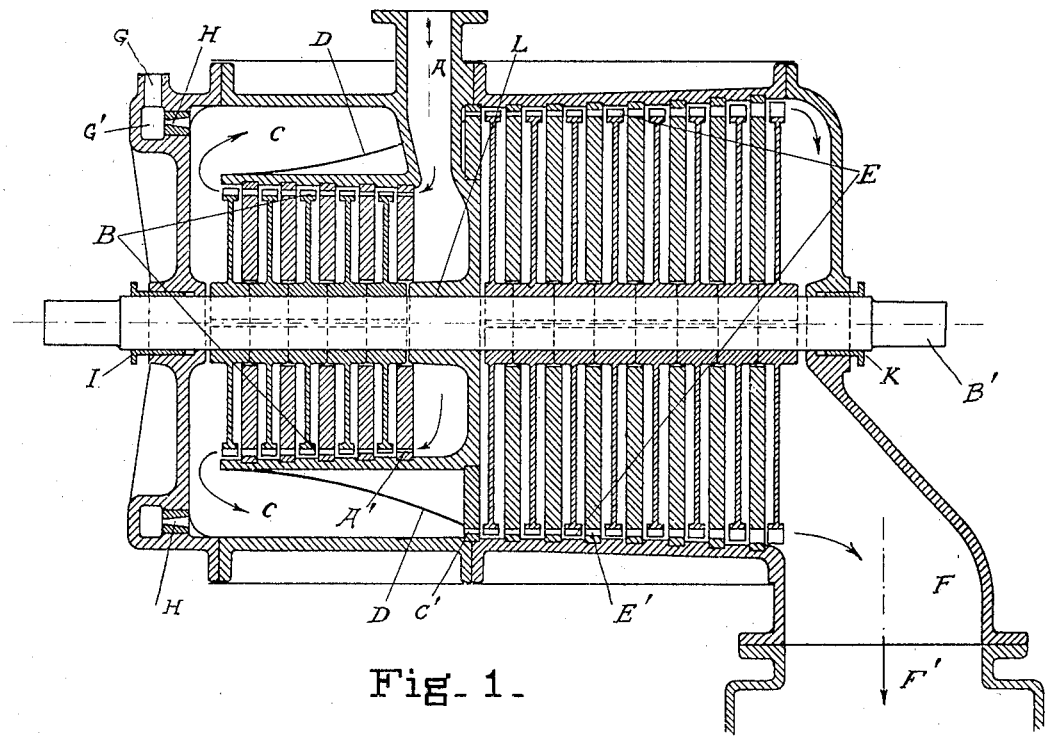
Figure 2:
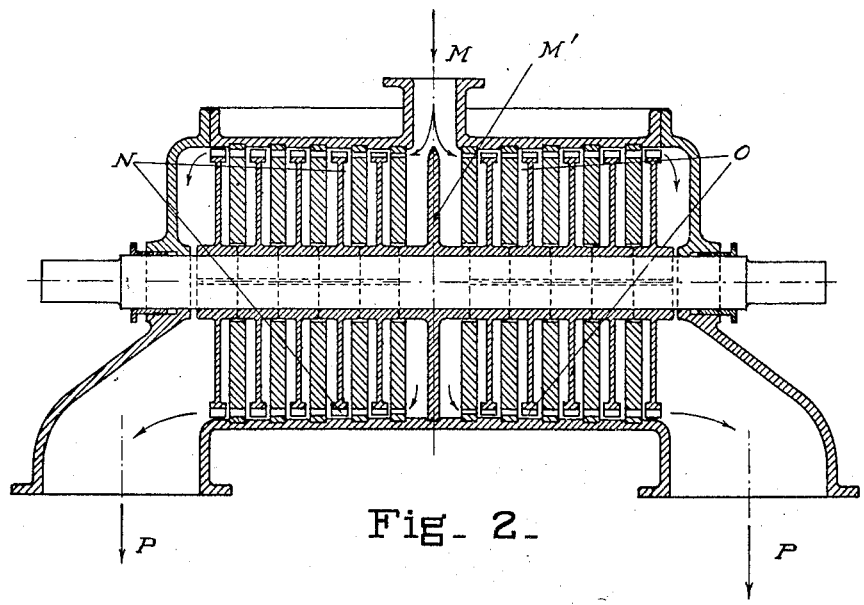

In the accompanying drawing, wherein are shown one or more of the various possible embodiments of the several features of this invention,—Figure 1 is a sectional elevation of a fluid turbine of the multiple stage type. Fig. 2 is a similar view of a single stage turbine.

Similar reference characters refer to similar parts throughout both views of the drawing.

In order that certain features of this invention may be readily and fully grasped, it may here be noted that in connection with turbines there is in general an axial thrust, due to the components of the forces acting upon the running blades or vanes extending in this direction, which often reaches a high value, with a consequent waste of energy and wear of parts by friction. If it be attempted to take up this thrust by means of heavy thrust bearings or balancing pistons not only is the turbine lengthened and rendered more heavy, cumbersome and complicated, but the parts exposed thereto on account of the high speed
of the shaft and the great pressure developed are in constant need of repair or renewal. It may also be noted that in turbine construction in which it is necessary to provide stuffing boxes about a rotary shaft, if the steam or other fluid employed be of a considerable pressure there is a tendency to leak at this point, with a corresponding waste of fluid and delay and annoyance in the running of the engine. It may also be noted that the use of dry steam is highly important in turbines, not only as a matter of efficiency but in order to prevent the wearing away of the blades by the particles of water contained in wet steam. Another feature to which attention should be directed is that turbines in general can be controlled in speed and power merely by the throttling of the steam supply, and have not the additional range of control which obtains in reciprocating engines by the variation of the cut-off. The above and other defects are eliminated and many positive advantages obtained in constructions of the nature of that herein described.

Referring now to Fig. 1 of the accompanying drawing, there is shown a two-stage turbine in which the steam or other motive fluid is supplied through the inlet A. From this point, as indicated by the arrows, the steam passes through the sets of stationary vanes A', alternating with the sets of running vanes B which, as is common in turbines of this general type, are fast upon the shaft B'. Passing through the cylinder in which these vanes are mounted the steam enters a space or chamber C, and flows in the reverse direction, indicated by the arrows, toward ports C', being guided as by the deflecting sheet D. From ports C' the steam passes through sets of running and stationary vanes E and E' respectively, these parts being of suitable form and mounting, to correspond with a reduced pressure of the steam. From the latter vanes the steam passes through the exhaust port F, either to the atmosphere or a condenser F'. The several vanes are so proportioned in number and form as to bring about the substantial equalization of the outward thrust exerted upon the shaft B' by the high pressure and low pressure sets respectively, thus doing away with any tendency to displace in an axial direction the running parts of the turbine. An auxiliary inlet G is preferably provided at one end of the turbine, the same leading into an annular passage G', from which it discharges into the chamber C as by the flaring nozzles H. By this means, in case of an excessive load upon the turbine, live steam may be led directly into the receiver of the exhaust of the high pressure element, thus raising the pressure of the steam to which the lower pressure element is exposed and increasing the range of control above that obtainable by throttling the main steam supply. The shaft B' at the points at which it is journaled within the casing or shell of the turbine is provided with suitable stuffing boxes, I and K respectively. As before noted, it has been found difficult to securely pack a rotary bearing against the action of high pressure steam, but it will be noted that in the present case the stuffing box I is exposed merely to the action of the steam exhausted from the high pressure cylinder, which may if desired be brought to a point substantially at atmospheric pressure, the corresponding reduction in pressure below the atmosphere at the stuffing box K presenting no objectionable features, as it is well established that bearings of this type are packed without difficulty against the sucking or indrawing action of a vacuum. The bearing L is exposed to pressure upon both sides, and the difference is merely that between the high and low pressure steam, thus rendering the leakage relatively small, and this leakage moreover is not wasted but enters directly into the low pressure element of the turbine, in which it performs useful work. At this point, if desired, a throttling stuffing box may be provided so as to permit any desired passage of steam and thus increase still further the range of control of the turbine.

In Fig. 2 of the drawing is shown a single stage turbine embodying certain features of my invention, the construction of which should be in a large part clear from the above matter. In this embodiment an inlet is provided at M near the center of the turbine, from which it is deflected by the plate M' throughout systems of vanes N and O toward exhaust passages P. In this manner the opposed axial thrusts are balanced. It may here be noted that the term "turbine" is used through this description and in the following claims in a broad sense as comprehending a rotary fluid-driven engine, whether of the action or re-action type, and whether horizontally, vertically or otherwise disposed.

The operation of the above-described embodiments of this invention will be clear from a description of that of the form shown in Fig. 1:—The steam, entering at A and passing through the high pressure element as above described, turns upon itself and passes toward the low pressure element, thus enveloping the outer walls of the high pressure cylinder and keeping them at a high temperature, with a consequent diminution of condensation thereon, assuming the turbine to be steam driven. The high temperature of these walls, moreover, occasioned by the corresponding pressure of the boiler steam, tends to heat and in some cases superheat, the exhaust steam passing about the same, and evaporates the particles of moisture which would otherwise obtain therein. In this manner the temperature and dryness of the steam entering the low pressure element are enhanced, with a consequent increase in power, and by reason of its dry character the wearing away of the vanes by friction with particles of water is done away with. From the low pressure element the steam passes to the condenser as above described, and the pressures may be so chosen as to avoid all tendency to leakage at the stuffing boxes, as has already been set forth.

It will thus be seen that there is provided a construction in which the several objects above mentioned are, among others, achieved, and that this construction is of the simplest and most inexpensive type. It will also be noted that not only is the efficiency of action of the engine enhanced and its range of power increased to a marked degree, but these objects are attained not by the use of auxiliary mechanism, but, in large part, by doing away with elements already in general use. The entire apparatus is simple, durable and compact, and is well adapted to withstand hard, practical use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:—

1. In construction of the class described, in combination, a high pressure cylinder, a low pressure cylinder, a passage extending about said high pressure cylinder throughout substantially the entire length thereof, means adapted to lead a fluid to said high pressure cylinder, and means adapted to lead the exhaust from said high pressure cylinder through said passage to said low pressure cylinder whereby said high pressure cylinder is jacketed by the steam passing to said low pressure cylinder.

2. In construction of the class described, in combination, a shaft, a high pressure set of vanes mounted thereon, a low pressure set of vanes mounted thereon, means adapted to lead a fluid through said high pressure set of vanes in a predetermined direction, a passage extending about and jacketing said high pressure set of vanes and adapted to receive the exhaust therefrom and lead the same to said low pressure set of vanes, and means adapted to lead said exhaust through said low pressure set of vanes in a direction substantially opposite to that of its passage through said high pressure vanes.

3. In construction of the class described, in combination, a shaft, a high pressure set of vanes mounted thereon, a low pressure set of vanes mounted thereon, means adapted to lead a fluid through said high pressure set of vanes in a predetermined direction, a passage extending about and jacketing said high pressure set of vanes and adapted to receive the exhaust therefrom and lead the same to said low pressure set of vanes, and means adapted to lead said exhaust through said low pressure set of vanes in a direction substantially opposite to that of its passage through said high pressure vanes, said high and low pressure sets of vanes being adapted to exert substantially equal and opposite thrusts upon the shaft upon which they are mounted.

In testimony whereof I affix my signature in the presence of two witnesses.

BRUNO HEYMANN.

Witnesses:
 FRANK X. MURPHY,
 J. R. CUNNINGHAM.